US011102211B2

United States Patent
Choukouk et al.

(10) Patent No.: US 11,102,211 B2
(45) Date of Patent: Aug. 24, 2021

(54) COMPUTER NETWORK FOR A SECURED ACCESS TO ONLINE APPLICATIONS

(71) Applicant: AMADEUS S.A.S., Biot (FR)

(72) Inventors: Ayoub Choukouk, Paris (FR); Alexandre Barras, Opio (FR); Mathieu Morino Baquetto, Saint-Laurent-du-Var (FR); Maria Assunta Domanico, Antibes (FR); Virginie Amar, Biot (FR); Jeremie Barlet, Nice (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 16/801,208

(22) Filed: Feb. 26, 2020

(65) Prior Publication Data
US 2020/0296105 A1 Sep. 17, 2020

(30) Foreign Application Priority Data

Mar. 12, 2019 (FR) ........................................ 1902494

(51) Int. Cl.
*H04L 29/06* (2006.01)
*H04L 29/08* (2006.01)

(52) U.S. Cl.
CPC .......... *H04L 63/101* (2013.01); *H04L 63/083* (2013.01); *H04L 67/02* (2013.01); *H04L 67/2828* (2013.01); *H04L 67/2842* (2013.01)

(58) Field of Classification Search
CPC ....... H04L 63/10; H04L 63/105; H04L 63/08; H04L 63/101; H04L 67/02; H04L 67/2828; H04L 67/2842
See application file for complete search history.

(56) References Cited

U.S. PATENT DOCUMENTS

| 8,095,972 | B1 | 1/2012 | Floyd et al. | |
|---|---|---|---|---|
| 9,219,720 | B1* | 12/2015 | Satpathy | ................. H04L 63/08 |
| 2008/0046983 | A1 | 2/2008 | Lester et al. | |
| 2008/0276309 | A1* | 11/2008 | Edelman | ............... G06F 21/335 726/9 |
| 2014/0101742 | A1* | 4/2014 | Wu | ......................... G06F 21/31 726/7 |
| 2015/0020214 | A1* | 1/2015 | Copsey | ................. H04L 63/105 726/27 |

(Continued)

OTHER PUBLICATIONS

Yang et al. "Method of single sign-on for independent web systems based on AJAX." Proceedings of 2013 3rd International Conference on Computer Science and Network Technology. IEEE, 2013.

(Continued)

*Primary Examiner* — Chirag R Patel
(74) *Attorney, Agent, or Firm* — Perry + Currier (57) ABSTRACT

A computer network (1) adapted to provide secured access to online applications hosted on application servers (10) to a requesting user (U). The network (1) comprises a login security server (20) configured for deciding access for the user based on data contained in a central generic access control file (32) and in the access request. The network (1) further comprises a centralized user identification component (40) configured for receiving identification data from user through a central login panel (42) and for sending an access grant or denial command to the application servers (10).

14 Claims, 3 Drawing Sheets

(56) References Cited

U.S. PATENT DOCUMENTS

2017/0134385 A1* 5/2017 Mitevski ............. H04L 63/0815
2019/0057204 A1* 2/2019 Marcovecchio .... H04L 63/1433
2019/0377853 A1* 12/2019 Obaidi ................. G06F 21/316

OTHER PUBLICATIONS

Takabi, Hassan et al. "StateMiner: an efficient similarity-based approach for optimal mining of role hierarchy." Proceedings of the 15th ACM symposium on Access control models and technologies. Jun. 11, 2010 pp. 55-64.

* cited by examiner

COMPUTER NETWORK FOR A SECURED ACCESS TO ONLINE APPLICATIONS

CROSS-REFERENCE TO RELATED APPLICATION

This application claims priority from French patent application no. 1902494, filed Mar. 12, 2019, the content of which is incorporated herein by reference.

FIELD

The present invention concerns a method and a computer network to provide secured access to applications for one or several users. The invention is particularly well-suited to online computer reservation systems (CRS), namely for managing the booking of flights.

BACKGROUND

A CRS is computer network that generally comprises one or more application servers hosting a plurality of applications, so called CRS applications. For instance, these applications are used to provide online services for a variety of tasks, such as booking plane tickets or hotel rooms, searching for travel offers and corresponding fares.

The CRS applications can be accessed from anywhere around the world, at any time and by any device (e.g. desktop, laptop, mobile phone, tablet). As a result, there is a need to provide a secured access to these CRS applications and thereby ensure the security of the data that are distributed through the CRS applications.

Upon receipt of a request emitted by a user to access an application, the application server hosting the application may grant access to the application. In order to protect access and prevent misuse of the CRS, security components are provided within the CRS. For instance, a login security server (LSS) may be provided to grant or deny access for a user requesting access to an application, based on data contained in a central generic access control (GAC) file and in the user access request.

More specifically, each application within the CRS requiring an access control is provided with an identification component. Even though all these identification components are ultimately connected to a centralized LSS, each application has to implement its own identification component connected to the LSS.

As a consequence, the user of each application is confronted with a different user interface for identification. Furthermore, the connection between the identification component and the LSS is not always guaranteed due to incompatibilities resulting from the differences in structure of the authentication message, or differences in versions between the identification components, etc.

Furthermore, once the user is identified, he/she should be able (or not) to access services by the applications executed on the distributed application servers in the open back-end (OBE) of the CRS computer network. The access or denial of access to the service is based on the respective user access rights which are stored in the GAC.

The GAC is a module that hosts a centralized database or file that contains the account information of all registered users including their respective access rights for each application hosted by the distributed servers. The GAC database may comprise several nodes to ensure stability in case one of the nodes fails another node may be solicited to process the user request.

The GAC module may be implemented in SQLite. The GAC file or database is stored within a cache memory on every OBE and wherein the OBE has to duplicate at fixed intervals the file from a central storage within the LSS.

Due to the ever-increasing amount of users of the CRS services, the size of the GAC SQLite file increases rapidly. For instance, the GAC file can triple within three years. The size of a GAC is now typically of the order to 6 GB (Giga Bytes). As a result, due to the vast amount of different CRS applications contained in the CRS architecture, it has become increasingly difficult to retrieve, duplicate and store each GAC file.

In existing CRS architectures, the GAC module distributes frequently user data to all applications across a large number of distributed servers (typically 2000 to 3000) to apply user account changes in particular with regard to their access rights. With a typical CRS architecture comprising up to 3000 servers, about 6 GB of data need to be distributed across the network every hour.

SUMMARY

According to a first aspect there is provided a computer network adapted to provide secured access to applications for a user, said computer network comprising: at least one application server hosting a plurality of applications, said at least one application server being adapted to receive an access request emitted by the user and to grant access to at least one of the plurality of applications; a login security server (LSS) configured for deciding access for the user based on data contained in a central generic access control file and in the access request; wherein the computer network further comprises a centralized user identification component adapted to interface with the at least one application server and the login security server, said at least one application server being configured to transmit the access request to the centralized user identification component, said access request comprising a list of at least one requested applications; and wherein the centralized user identification component is configured for: receiving the transmitted access request; displaying a central login panel to the user, said central login panel being adapted according to the at least one requested application; receiving identification data of the user from the central login panel; transmitting said identification data and the list of at least one requested application to the login security server; retrieving from the login security server an access grant or denial command for each of the at least one requested application; and sending said access grant or denial command to the at least one application server.

The central login panel is a single authentication interface that can be advantageously shared amongst all applications to provide the user credentials (login, password) to the logon security server for centralized authentication.

The centralized user identification component and the central login panel constitute a single entry point that prevents all applications from implementing their own login panel, thereby simplifying the overall system architecture while providing a unified security framework. This feature enables to prevent the proliferation of proprietary identification modules which are difficult to control and update.

Besides, non-transactional information that are in the local cache memory can be advantageously displayed to the user, thereby reducing the amount of data that is transmitted through the computer system for granting or refusing access to an online application. The fact that only transactional data such as the user credentials are transmitted over the network contributes to reduce the response time to perform user authentication.

According to a feature, the central login panel is associated with a cache memory adapted to store static non transactional data associated to said at least one requested application, at least part of said static non transactional data being displayed to the user by the central login panel, upon display of the central login panel.

According to another feature, the static non transactional data are distributed to the cache memory by means of a Content Delivery Network architecture.

This architecture is particularly efficient for delivering the static non-transactional data on a wide scale with short response time.

According to another feature, the non transactional data are selected by the centralized user identification component based on a user current location and said at least one requested application.

According to another feature, the central login panel is hosted in a server located close to the user, such as the server being located in the same country as the user location. This feature enables to a short response time.

According to another feature, the centralized user identification component is hosted by one of the servers of the computer network, in particular the login security server.

According to another aspect, the computer network further comprises: a generic access control file size reducing component configured for: retrieving data contained in the generic access control file, said data including access rights to said applications for a plurality of users; eliminating redundant and/or obsolete data from the central generic access control file so as to form a purged generic access control file; and a cache memory associated with the at least one application server for storing at least part of the data contained in the purged generic access control file.

As a result, the amount of data that is transmitted through the computer network namely to the various application servers can be greatly reduced, which enables lower bandwidth requirements and shorter response times.

According to another feature, the generic access control file size reducing component is further configured for splitting the purged central generic access control file into application-specific files so as to form a purged application-specific generic access control file prior to storing said file to said cache memory.

According to another feature, the generic access control file size reducing component is adapted to access the generic access control file upon request.

According to another feature, the generic access control file size reducing component is adapted to intercept and analyze the access grant or denial commands that are transmitted from the centralized user identification component to said at least one application server and update the generic access control file based on the analysis.

According to another feature, the generic access control file or sized-purged or reduced generic access control file is an SQL-compliant file or database, in particular SQLite-compliant.

According to another feature, the centralized user identification component is implemented with a light HTML (HypertextMarkup Language)/JQuery framework using cross-origin resource sharing technology as a communication language.

In a further aspect, a method for centralized user identification in a network comprises, at a centralized user identification component of the network: receiving an access request from at least one application server, the access request comprising a list of at least one requested application; displaying a central login panel to the user, said central login panel being adapted according to the at least one requested application; receiving identification data of the user from the central login panel; transmitting said identification data and the list of at least one requested applications to a login security server of the network; retrieving from the login security server an access grant or denial command for each of the at least one requested application; sending said access grant or denial command to at least one application server of the network to grant access to the at least one requested application.

According to further aspects, the method comprises method steps corresponding to any one of the computer network functions set out above.

In a further aspect, a computer program product comprises program code instructions stored on a computer readable medium to execute the method steps according to the methods set out above when said program is executed on a computer.

In a still further aspect, a computer system acting as a centralized user identification component of a network is adapted to interface with at least one application server and the login security server of the network, and said centralized user identification component is configured to: receive an access request from the at least one application server, the access request comprising a list of at least one requested application; displaying a central login panel to the user, said central login panel being adapted according to the at least one requested application; receive identification data of the user from the central login panel; transmit said identification data and the list of at least one requested applications to the login security server; retrieve from the login security server an access grant or denial command for each of the at least one requested application; and send said access grant or denial command to at least one application server of the network to grant access to the at least one requested application.

In addition, in some embodiments, the computer system is further configured to execute any one of the functionalities set out above.

BRIEF DESCRIPTIONS OF THE DRAWINGS

The present mechanisms will now be described according to a particular embodiment, by way of example only, and with reference to the following drawings in which.

DETAILED DESCRIPTION

Figure 1:
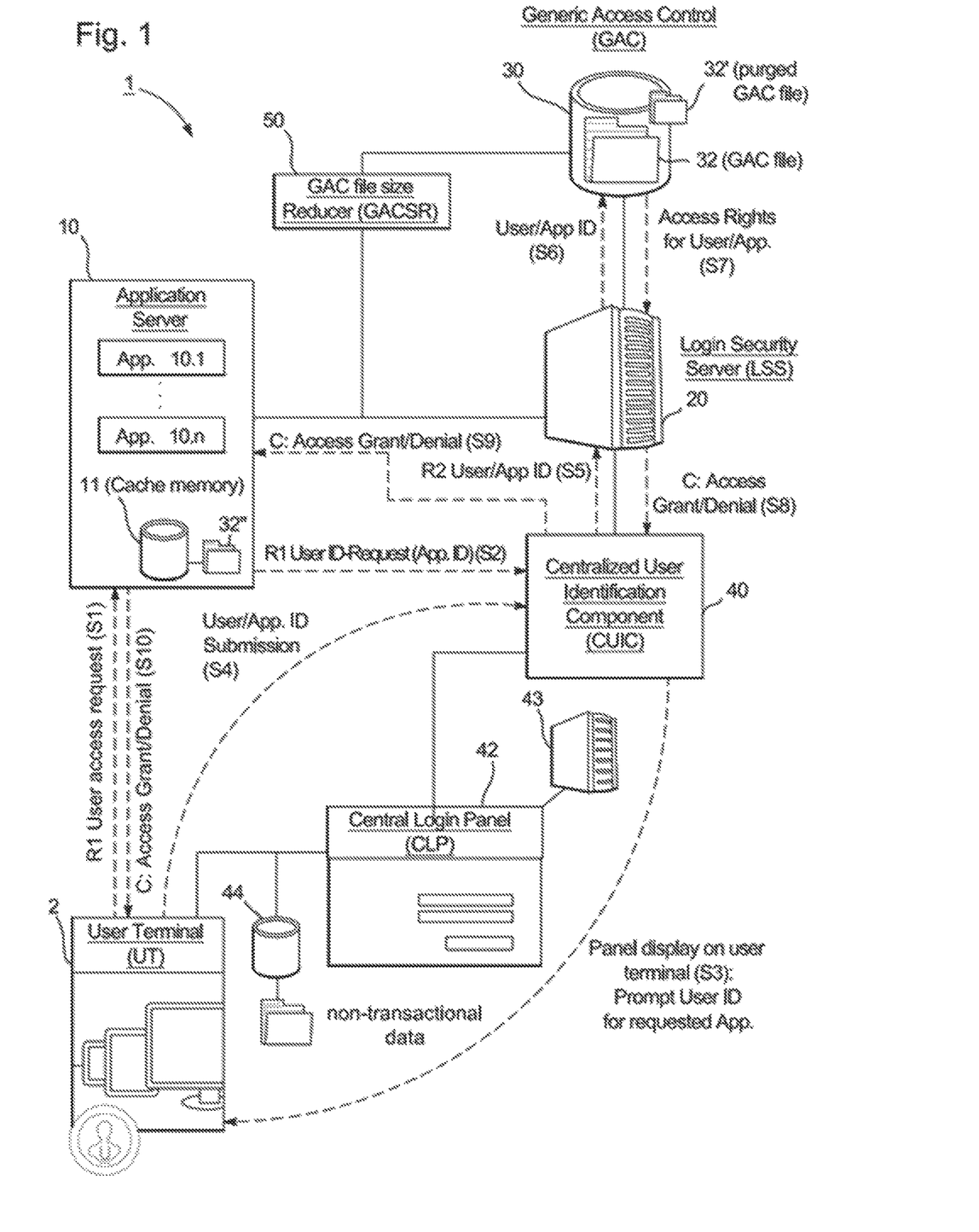
FIG. 1 illustrates the architecture of computer network according to the present invention.

The computer network 1 as depicted in FIG. 1 is a computer reservation system that may be implemented to provide secured access to online applications for a user U. The present embodiment is described in the context of travel booking. As will be described in greater detail below.

The computer network or CRS 1 comprises an application server 10 hosting a plurality of applications 10.1, ..., 10.n. For the sake of simplicity, only one application server is considered in the present embodiment but the description also applies when a plurality of servers are distributed across the Internet to provide a plurality of online services to users. Each constitutive element of the computer network 1 is adapted to communicate by means of conventional means, namely via the Internet.

In order to access an online service provided by one or more applications on the application server 10, the user U sends S1 by means of a terminal 2 an access request R1 to the application server 10. The terminal 2 may be a personal computer such as a laptop or desktop or a mobile phone or a tablet. The access request is sent via conventional communications means (e.g. via 4G, Wi-Fi, Ethernet, etc). The access request R1 is generated by a client of the application server installed on the user terminal 2. The access request R1 comprises a list of at least one requested application on this application server 10. In other embodiments, several applications may be requested on distinct application servers (not represented).

Upon receipt of the access request R1, the application server 10 transmits or forwards S2 the access request R1 to a centralized user identification component 40 (abbreviated CUIC). The CUIC 40 is adapted to interface with the application server 10 and a login security server 20 (abbreviated LSS).

The LSS 20 is configured for deciding access for the user U based on data contained in a central generic access control file 32 and in the access request R1.

A generic access control (abbreviated GAC) module 30 is provided to store at least the access rights of registered users for each application. By definition, a registered user is a user for whom an account has been created in the computer network. In the present embodiment, the user account data including the user access rights respective to all applications are stored in the form of a single file 32 in a memory of the GAC module 30. For instance, this file complies with SQL (Structured Query Language) and more particularly with SQLite which is well particularly well-adapted for querying and maintaining the database. In other embodiments, this information may be stored in a database, for instance a relational database. This database may comply with SQL and more particularly with SQLite.

More specifically, the CUIC 40 is configured for: receiving S2 the transmitted access request R1; displaying S3 a central login panel 42 to the user, said central login panel being adapted according to the at least one requested application; receiving S4 identification data of the user from the central login panel 42; transmitting S5 said identification data and the list of at least one requested applications to the login security server 20; retrieving S8 from the login security server 20 an access grant or denial command for each of the at least one requested application; and sending S9 said access grant or denial command to the application server 10.

In the present embodiment, the CUIC 40 is implemented with a light HTML/JQuery framework using cross-origin resource sharing technology as a communication language. This technology is particularly advantageous as it supports all kinds of HTML requests with a high level of security.

The CUIC 40 is preferably hosted in the LSS 20 so as to improve the latency of the user identification. In other embodiments, the CUIC 40 may be hosted by any one of the servers of the computer network 1, wherever deemed more appropriate.

The central login panel 42 (abbreviated CLP) is an interface that is common to all applications. It is displayed directly on the user terminal 2 upon receipt of the access request by the CUIC 40. The CLP 42 constitutes a single entry point by means of which any user requesting access to an application can centrally submit his/her credentials (i.e. registered login and password) or identification data before being directed to the requested application. Implementing the CLP 42 prevents from implementing a separate login panel within each application individually. This feature is particularly useful as each user interface for authentication normally has its own security requirements such as password encryption.

The CLP 42 may be hosted in a server 43 located close to the user. The proximity of this hosting server 43 and the user is advantageous to display more rapidly the CLP 42 on the user terminal 2.

Therefore, implementing the CUIC 40 together with the CLP 42 according to the present invention substantially simplifies the implementation of authentication in the computer network 1. This is particularly advantageous when adding new applications hosted on additional distributed application servers or upgrading security constraints or parameters for all applications at once. Implementing the CUIC 40 and the CLP 42 for more than one application advantageously provides a unified identification user experience on any of the CRS online services with a single point of entry, thereby enabling system administrators to focus on a single component and contributes to improving the CRS computer network security.

The CLP 42 may be associated with a local cache memory 44 adapted to store static non transactional data associated to the requested applications. At least part of said static non transactional data may be displayed to the user by the CLP 42, upon display of the CLP. By definition, non-transactional data designate all types of non-sensible information (e.g. text, image, video, sound) excluding personal data provided by the user to perform a transaction (e.g. credit card details transmitted for booking a flight). For instance, non-transactional data may include general information which is specific to the requested application, such as the logo of the airline company from which the user intends to book a flight. Thus, the non-transactional data may be advantageously used to customize the CLP 42 according to the user access request R1 received by the CUIC 40. Providing the non-transactional data in the local cache memory 44 is particularly advantageous for reducing the loading time of the information to be displayed to the user on the CLP 42, especially when this information comprises high-resolution images and/or videos.

The static non transactional data may be distributed to the cache memory 44 by means of a Content Delivery Network architecture. This architecture is particularly well adapted to deliver efficiently the static non-transactional data on a wide scale with short response times.

The non-transactional data may be selected by the CUIC 40 based on the user current location and the requested application. In that case, the user location may be included in the access request R1 by the user client installed on the user terminal 2. By default, the user location may be obtained from the IP address of the user terminal 2 used to send the access R1 by the terminal.

The CUIC 40 may hosted by one of the servers of the computer network 1, in particular the LSS 20. Preferably, the CPL 42 is hosted in a server located close to the user.

Authentication may be performed using a security standard such as Open ID Connect. This security standard has the advantage that it is widely used.

Once the user U has submitted his/her credentials (function S4) via the CPL 42 displayed on the screen of his/her terminal 2, these are received by the CUIC 40.

From the user access request R1 received from the application server 10 and from the user credentials received from the centralized CLP 42, the CUIC 40 generates a second request R2 that includes the user credentials and the list of requested applications to the LSS 20 (function S5).

Upon receipt of the second request R2, the LSS 20 consults GAC file 32 maintained by the GAC module 30 (function S6) and retrieves therefrom the access rights of the user associated with the requested applications in the (function S7). Based on the retrieved access rights, the LSS 20 determines whether access should be granted or denied to the requested application for the identified user.

In response to the second request R2, the LSS 20 provides an grant or denial command for each of the applications to which access is requested by the user U according to the first request R1. This grant or denial command is retrieved by the CUIC 40 from LSS 20 (function S8).

Then, the grant or denial command is sent by the CUIC 40 to the application server 10 hosting the requested applications (function S9). Upon receipt of this command, the application server 10 grants or denies access to each of the requested applications to the user (function S10).

According to another aspect, the CRS computer network 1 may further comprise a generic access control file size reducing component 50 configured for: retrieving data contained in the generic access control file 32, said data including access rights to said applications for a plurality of users; eliminating redundant and/or obsolete data from the central generic access control file 32 so as to form a purged generic access control file 32'.

The generic access control file size reducing component or GAC file size reducer 50 (abbreviated GACSR) advantageously reduces the size of the generic access control file by removing therefrom any redundant and/or obsolete data.

According to the data structure employed to store the information the GAC file 32 (such as the user identification data and the corresponding access rights for the various applications), some redundancies may be suppressed as the same user access rights may be repeated in multiple fields of the GAC file or database. The GAC file 32 purged from redundant and/or obsolete data may be stored as a purged GAC file 32' in a memory of the GAC module 30.

According to the present embodiment, the application server 10 further comprises a cache memory 11 adapted to store one or more size-reduced GAC files 32.1 obtained from the GAC file 32. These size-reduced GAC files 32.1 may be fully or partly duplicated from the purged GAC file 32'. These files are transferred to the cache memory 11 of the application server 10 by conventional network communication means.

For instance, the inventors have shown that redundancy removal implemented by the GACSR 50 in a CRS computer network comprising about 3,000 application servers enables to drastically reduce the amount of GAC data transferred to the application servers down to 2 GB per hour, as compared with 6 GB per hour without any redundancy removal.

To further reduce the size of the size-reduced GAC files stored in the cache memory 11 of the application server 10, the GACSR 50 is further configured for splitting the purged central generic access control file 32' into application-specific files so as to form a purged application-specific generic access control file 32" prior to storing said file to said cache memory 11.

The implementation of the GACSR 50 drastically reduces the size of the SQLite GAC file to be duplicated from a master version obtained from the GAC file 32 (e.g. purged and application specific GAC file) and sent to the cache memory 11 of the application server 10.

By sending only relevant application-specific data to the respective application servers, an update performed centrally on the original or master version of the GAC file may be applied locally to the application servers much more rapidly than if the full content of the original GAC had to be sent to all application servers regardless of the applications hosted by these servers.

The implementation of the GACSR 50 enables to efficiently reduce the network overall traffic and optimize usage of the network resources such as bandwidth, processing and energy. As a result, the performances of the CRS computer network 1 are drastically improved. In particular, users may access the requested applications with lower latencies and quicker data transfers to the application servers to facilitate the propagation of updates to the application servers. Splitting the GAC file into smaller files containing up-to-date data pertaining to the same application server allows to send dedicated updates to each application server separately. This splitting advantageously avoids having one single point of failure in case of file corruption.

The GACSR 50 is adapted to access the GAC file 32 upon request. This request may be issued automatically, for instance periodically at predetermined time intervals to maintain the file up-to-date on a relevant time basis.

Alternately, the GACSR 50 is adapted to intercept and analyze the access grant or denial commands C that are transmitted from the CU IC 40 to the application server 10 and update the generic access control file based on the analysis. In that case, the GACSR 50 interfaces not only with the GAC module 30 that hosts the GAC file 32 or different versions thereof (e.g. purged GAC file 32') but also with the LSS 20.

Preferably, the GACSR 50 interfaces with the LSS 20 that hosts the GAC module 30 by means of a single interface in order to minimize the number of interfaces that the system administrators have to manage.

Figure 2:
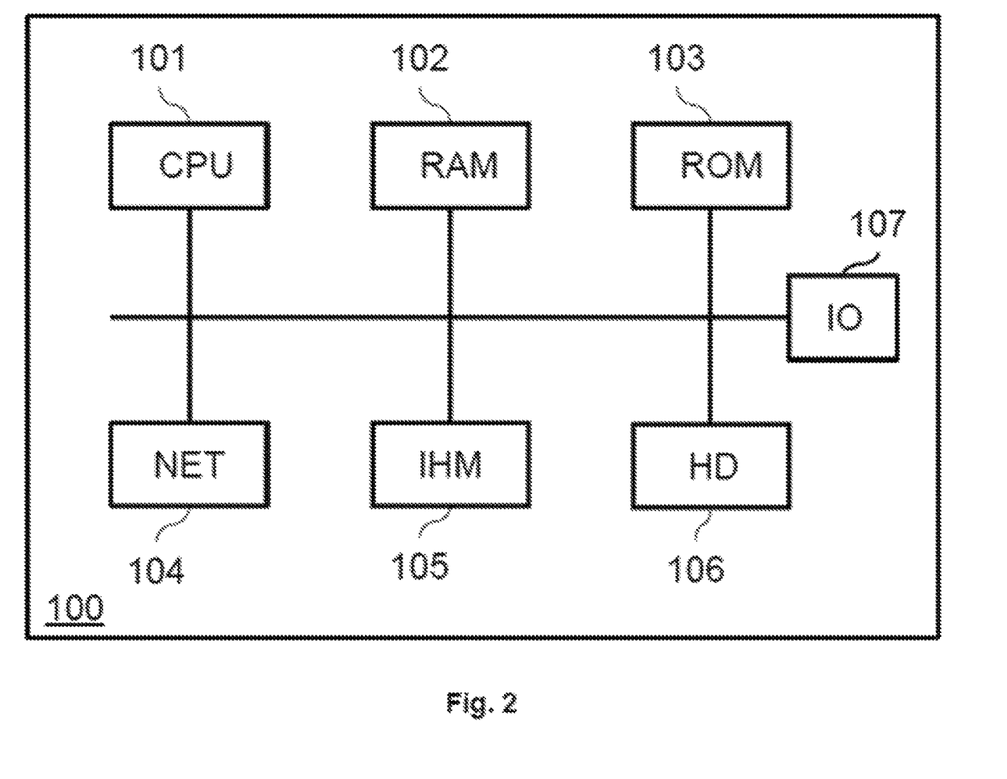
FIG. 2 is schematic block diagram of a computing device 100 for the implementation of the computer architecture of the invention.

FIG. 2 is a schematic block diagram of a computing device 100 for implementation of one or more embodiments, in particular servers such as the login security server 20, the application server 10.

The computing device 100 may be a device such as a workstation. The computing device 100 comprises a communication bus connected to: a central processing unit 101, such as a microprocessor, denoted CPU; a random access memory 102, denoted RAM, for storing the executable code to implement any of the modules or software components according to the invention as well as the registers adapted to record variables and parameters necessary for implementing these modules or components, the memory capacity thereof can be expanded by an optional RAM connected to an expansion port for example; a read only memory 103, denoted ROM, for storing computer programs for implementing embodiments of the invention, in particular the GACSR 50, GAC 30, CUIC 40, CLP 42; a network interface (NET) 104 is typically connected to a communication network over which digital data to be processed are transmitted or received. The network interface 104 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 101; a user interface 105 (denoted IHM, interface human/machine) may be used for receiving inputs from a user or to display information to a user; a hard disk 106 denoted HD may be provided as a mass storage device; an I/O module 107 may be used for receiving/sending data from/to external devices such as a video source or display.

Figure 3:
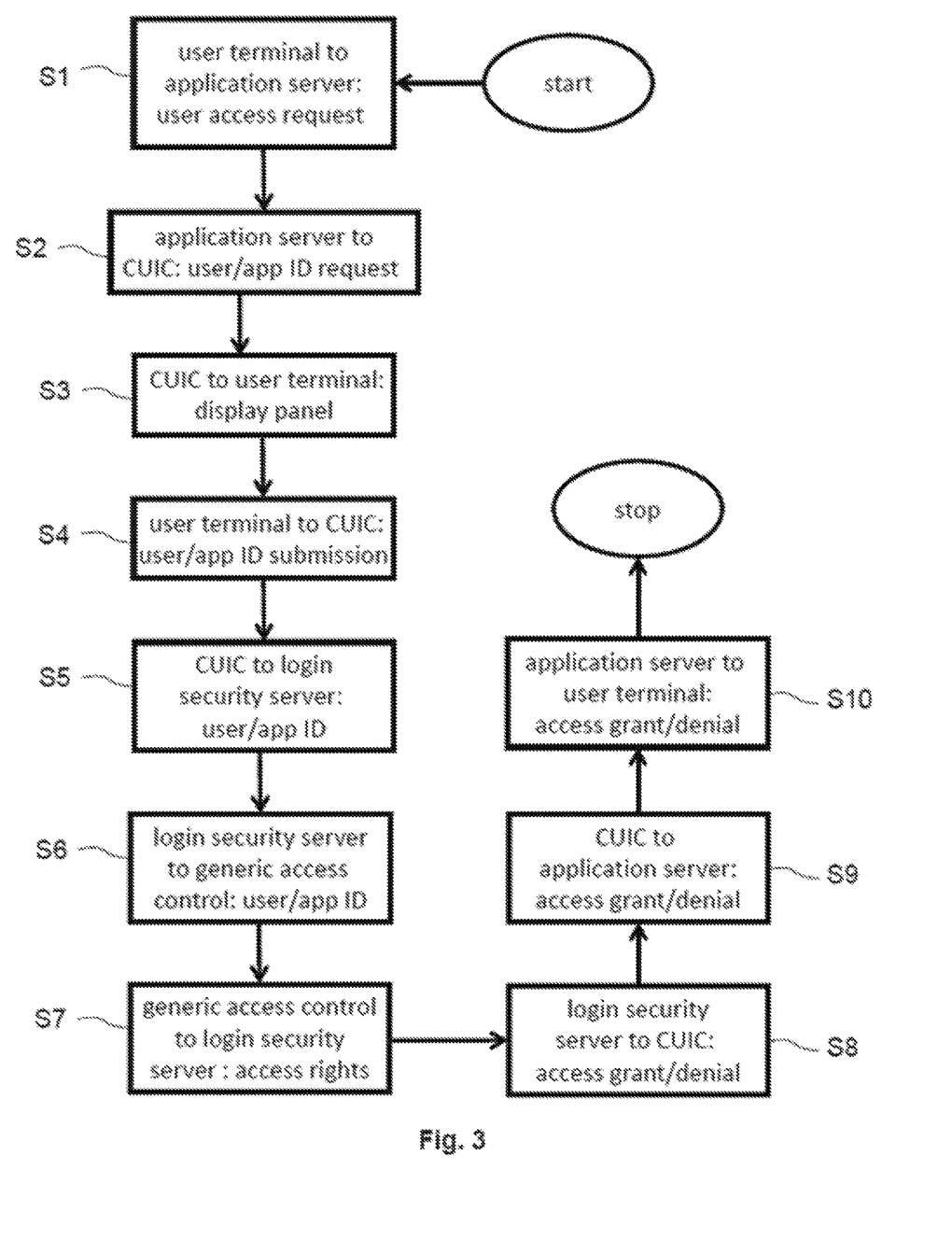
FIG. 3 is a flow chart visualizing method activities according to embodiments taught herein.

FIG. 3 visualizes a method algorithm according to some embodiments. In S1, the user terminal 2 transmits and the application server 10 receives the access request R1. In S2, the application server 10 transmits or forwards S2 the access request R1 to the CUIC 40. In S3, the CUIC 40 displays the panel on the user terminal and prompts the user to enter credentials (e.g. user ID or ID for the requested application). In S4, the user terminal submits the user or application ID to the CUIC 40. In S5, the CUIC 40 transmits the user or application ID to the LSS 20. In S6, the LSS 20 sends the user or application ID to the GAC 30. In S7, the GAC sends the access rights for the user or application back to the LSS 20. In S8, the LSS 20 sends the access grant or denial to the CUIC 40. In S9, the CUIC 40 sends the access grant or denial to the application server 10. In S10, the application server 10 sends the access grant or denial to the user terminal 2.

The executable code may be stored either in read only memory 103, on the hard disk 106 or on a removable digital medium such as for example a disk. According to a variant, the executable code of the programs can be received by means of a communication network, via the network interface 104, in order to be stored in one of the storage means of the communication device 100, such as the hard disk 106, before being executed.

The central processing unit 101 is adapted to control and direct the execution of the instructions or portions of software code of the program or programs according to embodiments of the invention, which instructions are stored in one of the aforementioned storage means. After powering on, the CPU 101 is capable of executing instructions from main RAM memory 102 relating to a software application after those instructions have been loaded from the program ROM 103 or the hard disk (HD) 106 for example. Such a software application, when executed by the CPU 101, causes the functions S1-S10 described in reference to FIG. 1 and FIG. 3, respectively, to be performed.

Any function of the algorithm shown in FIG. 3 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present mechanisms have been described hereinabove with reference to a specific embodiment, they are not limited to this specific embodiment, and modifications will be apparent to a skilled person in the art which lie within the scope. The word "comprising" does not exclude other elements or functions.

The invention claimed is:

1. A computer network adapted to provide secured access to applications for a user, said computer network comprising:
    at least one application server hosting a plurality of applications, said at least one application server being adapted to receive an access request emitted by the user and to grant access to at least one of the plurality of applications;
    a login security server configured for deciding access for the user based on data contained in a central generic access control file and in the access request;
    a generic access control file size reducing component configured for:
        (i) retrieving data contained in the generic access control file, said data including access rights to said applications for a plurality of users; and
        (ii) eliminating at least one of redundant data or obsolete data from the central generic access control file so as to form a purged generic access control file;
    a cache memory associated with the at least one application server for storing at least part of the data contained in the purged generic access control file;
    said computer network further comprising a centralized user identification component adapted to interface with the at least one application server and the login security server, said at least one application server being configured to transmit the access request to the centralized user identification component, said access request comprising a list of at least one requested application;
    and said centralized user identification component is configured for:
        receiving the transmitted access request;
        displaying a central login panel to the user, said central login panel being adapted according to the at least one requested application;
        receiving identification data of the user from the central login panel;
        transmitting said identification data and the list of at least one requested applications to the login security server;
        retrieving from the login security server an access grant or denial command for each of the at least one requested application; and
        sending said access grant or denial command to the at least one application server.

2. The computer network according to claim 1, wherein the central login panel is associated with a cache memory adapted to store static non transactional data associated to said at least one requested application, at least part of said static non transactional data being displayed to the user by the central login panel, upon display of the central login panel.

3. The computer network according to claim 2, wherein the static non transactional data are distributed to the cache memory by means of a Content Delivery Network architecture.

4. The computer network according to claim 2, wherein said non transactional data are selected by the centralized user identification component based on a user current location and said at least one requested application.

5. The computer network according to claim 1, wherein the central login panel is hosted in a server located close to the user, such as the server being located in the same country as the user.

6. The computer network according to claim 1, wherein the centralized user identification component and the login security server are hosted on a common computing device.

7. The computer network according to claim 1, wherein the generic access control file size reducing component is further configured for splitting the purged central generic access control file into application-specific files so as to form a purged application-specific generic access control file prior to storing said file to said cache memory.

8. The computer network according to claim 1, wherein the generic access control file size reducing component is adapted to access the generic access control file upon request.

9. The computer network according to claim 1, wherein the generic access control file size reducing component is adapted to intercept and analyze the access grant or denial commands that are transmitted from the centralized user identification component to said at least one application server and update the generic access control file based on the analysis.

10. The computer network according to claim 1, wherein the generic access control file or purged generic access control file is an SQLite-compliant file or database.

11. The computer network according to claim 1, wherein the centralized user identification component is implemented with a light HTML/JQuery framework using cross-origin resource sharing technology as a communication language.

12. A method for centralized user identification in a network, the method comprising, at a centralized user identification component of the network:
retrieving data contained in a generic access control file, said data including access rights to applications for a plurality of users;
eliminating at least one of redundant data or obsolete data from the central generic across control file so as to form a purged generic access control file;
storing at least part of the purged generic access control file in a cache memory associated with at least one application server, for use by a login security server to grant or deny access to the at least one application server;
receiving an access request from at least one application server, the access request comprising a list of at least one requested application;
displaying a central login panel to the user, said central login panel being adapted according to the at least one requested application;
receiving identification data of the user from the central login panel;
transmitting said identification data and the list of at least one requested applications to the login security server of the network;
retrieving from the login security server an access grant or denial command for each of the at least one requested application; and
sending said access grant or denial command to at least one application server of the network to grant access to the at least one requested application.

13. A non-transitory computer program product comprising program code instructions stored on a computer readable medium, the program code instructions executable by a computer to:
retrieve data contained in a generic access control file, said data including access rights to applications for a plurality of users;
eliminate at least one of redundant data or obsolete data from the central generic access control file so as to form a purged generic access control file;
store at least part of the purged generic access control file in a cache memory associated with at least one application server, for use by a login security server to grant or deny access to the at least one application server;
receive an access request from at least one application server, the access request comprising a list of at least one requested application;
display a central login panel to the user, said central login panel being adapted according to the at least one requested application;
receive identification data of the user from the central login panel;
transmit said identification data and the list of at least one requested applications to the login security server;
retrieve from the login security server an access grant or denial command for each of the at least one requested application; and
send said access grant or denial command to at least one application server of the network to grant access to the at least one requested application.

14. A computer system acting as a centralized user identification component of a network, the computer system being adapted to interface with at least one application server and the login security server of the network, and in that said centralized user identification component is configured to:
retrieve data contained in a generic, access control file, said data including access rights to applications for a plurality of users;
eliminate at least one of redundant data or obsolete data from the central generic access control file so as to form a purged generic access control file;
store at least part of the purged generic access control file in a cache memory associated with at least one application server, for use by a login security server to grant or deny access to the at least one application server;
receive an access request from the at least one application server, the access request comprising a list of at least one requested application;
display a central login panel to the user, said central login panel being adapted according to the at least one requested application;
receive identification data of the user from the central login panel;
transmit said identification data and the list of at least one requested applications to the login security server;
retrieve from the login security server an access grant or denial command for each of the at least one requested application; and
send said access grant or denial command to at least one application server of the network to grant access to the at least one requested application.

\* \* \* \* \*